United States Patent [19]

Gardner

[11] 4,385,833
[45] May 31, 1983

[54] APPARATUS FOR RECEPTION AND RADIATION OF ELECTROMAGNETIC ENERGY IN PREDETERMINED FIELDS OF VIEW

[75] Inventor: Leland V. Gardner, Buellton, Calif.

[73] Assignee: Santa Barbara Research Center, Goleta, Calif.

[21] Appl. No.: 213,266

[22] Filed: Dec. 5, 1980

[51] Int. Cl.³ .............................................. G01B 11/26
[52] U.S. Cl. ................................... 356/141; 102/213; 250/353; 350/292; 350/299; 362/297
[58] Field of Search ......................... 102/213; 250/353; 356/141, 152; 362/297, 298; 350/292, 299

[56] References Cited

U.S. PATENT DOCUMENTS

| 3,254,557 | 6/1966 | Brake et al. | 356/373 |
| 3,555,285 | 1/1971 | Irving | 356/152 |
| 3,786,757 | 1/1974 | Goldstein et al. | 102/213 |
| 3,966,329 | 6/1976 | Dickey | 356/152 |
| 3,977,628 | 8/1976 | Barron | 356/152 |
| 4,195,574 | 4/1980 | MacNeille | 102/213 |
| 4,271,360 | 6/1981 | Ward | 350/292 |

Primary Examiner—S. C. Buczinski
Attorney, Agent, or Firm—William J. Benman, Jr.; William J. Bethurum; Anthony W. Karambelas

[57] ABSTRACT

An optic receiver capable of detecting the angle of incidence of optical energy in a plurality of fields of view relative to an airborne frame of reference. Incoming rays are reflected by surfaces arranged at predetermined angles relative to an input aperture so as to reflect rays in predetermined fields of view into parallelism with the receiver axis and ultimately to a line image at an output aperture. Power distribution along the line image varies with the azimuth of the target reflection. Computation of target azimuth from the power distribution along the line image is facilitated by photodetectors mounted on the element and associated electronic circuitry.

3 Claims, 11 Drawing Figures

APPARATUS FOR RECEPTION AND RADIATION OF ELECTROMAGNETIC ENERGY IN PREDETERMINED FIELDS OF VIEW

BACKGROUND OF THE INVENTION

1. Field of the Invention

This invention relates to transmitters and receivers of electromagnetic energy. More specifically, it relates to improved transmitters and receivers that provide an indication of the angle of incidence of electromagnetic energy in a plurality of fields of view. While the present invention is described herein with reference to particular embodiments, it should be understood that the invention is not limited thereto. The present invention may be adapted and employed for a variety of electromagnetic requirements as those skilled in the art will recognize in light of the present disclosure.

2. Description of the Prior Art

Conventional techniques for obtaining the azimuth or angle of incidence of optical or other electromagnetic energy typically utilized either an array of directional detectors or a single directional detector adapted to rotate through the target plane.

The array approach requires the use of a plurality of highly directional receivers. Each receiver is assigned to a section of the area to be scanned. In an optical system, each receiver would include a photodetector and an associated electronic circuit so that any optical energy detected by the receiver would be electrically interpreted as coming from a predetermined direction.

Obviously, this approach can be costly where accurate angle determinations must be made. That is, the cost/performance of such a system would depend on the number of detectors or receivers required. Moreover, no matter how many receiver elements are utilized, accuracy would be limited by the inherent shortcomings of a discreet system. That is, it is impossible to determine where the image is within the assigned sector.

These shortcomings can be avoided somewhat by utilizing a rotating receiver approach. Here a highly directional receiver element is mounted for rotation so that a single receiver element can scan the desired area. This technique can be somewhat more accurate than that of the dedicated array insofar as the exact angle at which the element is pointed is known. However, the rotating element approach suffers from limitations common to mechanical systems, i.e., speed and durability. The response time of a system utilizing this technique would be much longer than that of the dedicated array. Actual response could be improved somewhat by using several receiver elements, however, where ultra fast response is required, this solution may be too costly.

A third approach calls for the utilization of linear detector arrays with complicated lenses having a fairly high resolution over large fields of view. Such lenses are currently so expensive too to be cost effective for most conventional applications.

One solution to these problems has been provided by an invention disclosed in Applicant's copending application entitled "Apparatus for Determining Angle Incidence of Electromagnetic Energy", Ser. No. 155,887, now U.S. Pat. No. 4,325,633. There an element is provided which is adapted to transform incoming electromagnetic energy to a line image having a radiant power distribution along its length which is peculiar to the angle of incidence thereof. The power distribution of the line image is then measured by a detector to provide an electrical signal proportional to the angle of incidence.

While the invention described in the copending application provides a simple, accurate and inexpensive solution to the above mentioned prior art systems, the element provided is capable of detecting electromagnetic energy in only a single field of view. As a result, in applications where it is desirable to have two or more fields of view, a detector must be provided for each field of view required, e.g. where two sets of data are required as for target orientation, or velocity or in a range sensing application where system attitude and flight direction are to be determined. It is evident that as the number of fields of view required increase, the cost and complexity of the system increases accordingly. It is therefore desirable to provide transmitters and receivers capable of radiating and detecting electromagnetic energy in a plurality of fields of view using a single element.

SUMMARY OF THE INVENTION

One embodiment of the invention is a receiver for providing electrical signals corresponding to the angles of incidence of electromagnetic radiation from a target in any of a plurality of predetermined fields of view. The receiver includes an element having a plurality of surfaces which reflect the electromagnetic radiation to a line image at an output aperture. An electromagnetic detector is also included which by measuring the power distribution along the line image, provides an electrical signal which may be used to determine the angle of incidence of the electromagnetic energy. It is contemplated that where the present invention is utilized as a receiver, it will be used in conjunction with a plurality of transmitters of electromagnetic radiation adapted for alternative transmission in synchroneity with the switching mechanism of the receiver. The receiver element includes a first planar transparent surface which provides an input aperture. Second and third co-parallel planar surfaces are provided which extend normally from the first planar surface to at least partially define a chamber therebetween. The second and third surfaces provide at least partially reflective interior sidewalls for the chamber. A plurality of fourth planar surfaces are provided, one for each field of view desired. These surfaces extend normally between the second and third surfaces to at least partially define the top and rear surfaces of the chamber. Each of the fourth surfaces is disposed relative to the first surface to reflect electromagnetic radiation to a fifth surface.

In the second embodiment, the element is used in conjunction with a transmitter of electromagnetic radiation and apparatus conventionally required to align the radiation relative to the element. It is contemplated that when the present invention is used as a transmitter, it will be used in conjunction with two electromagnetic detectors each having a single field of view.

In the transmitter embodiment, the fifth surface is a transparent output aperture. However, in the receiver embodiment, the fifth surface is a curved reflective surface extending normally between the second and third surfaces to define the floor of the chamber. In this embodiment, electromagnetic radiation is reflected by the fifth surface to a line image on an output aperture where the electromagnetic radiation detector is located.

DESCRIPTION OF THE INVENTION

Figure 1A:
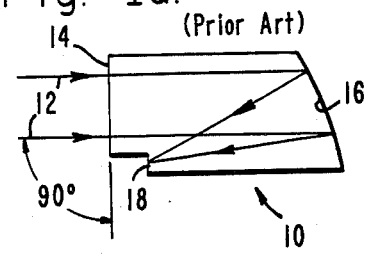
FIGS. 1a and 1b show side elevational views and a top view, respectively, of a cross-section of a receiver element of the prior art.
Figure 1B:
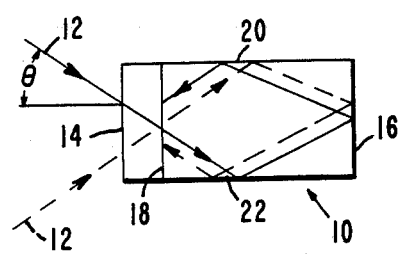
Figure 2A:
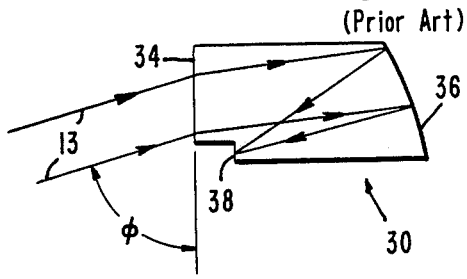
FIGS. 2a and 2b show side elevational views and a top view, respectively, of a second receiver element of the prior art.

FIGS. 1 and 2 show optic receiver elements known in the art. The optic receiver element 10 of FIG. 1 is designed to have a flat field of view. That is, rays of light 12 enter the receiver 10 at aperture 14 and are reflected off surface 16 to a line image at output aperture 18. As shown more clearly in the top view of FIG. 1b, rays of light 12 which enter at various roll angles enter the surface 14 and are reflected off the side walls 20 and 22 in order to provide a flat field of view. An element of this design is described and claimed in the above-identified copending application, Ser. No. 155,887 U.S. Pat. No. 4,325,633.

Figure 2B:
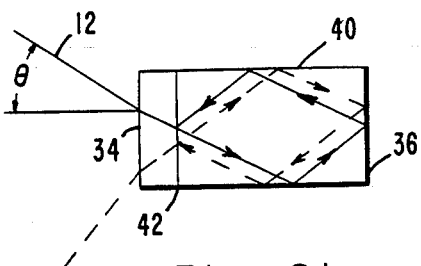

FIG. 2 shows a receiver element 30 adapted to provide a conic surface field of view. Rays of light 12 entering input aperture 34 at a predetermined cone angle are refracted so that they strike surface 36 and are reflected thereby to output aperture 38. As shown more clearly in the top view of FIG. 2b, the third dimension of the cone is generated in that rays of light 12 within predetermined roll angles enter the detector 30 at aperture 34 and reflect off sides 40 and 42 to surface 36 and ultimately to output aperture 38.

As described in U.S. Pat. No. 4,325,633, sides 20, 22, 40, and 42 are typically cladded so that rays of light entering at roll angles or angles of incidence outside a predetermined range are absorbed by a absorbing black layer.

The receiver element of FIGS. 1 and 2 typify prior art receiver elements in that each is capable of receiving electromagnetic radiation in a single field of view. As described more fully below, the element of the present invention is adapted to provide an output corresponding to a target detection in any one of a plurality of fields of view.

Figure 3:
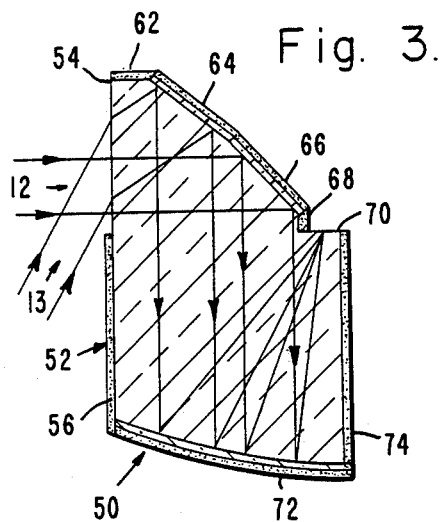
FIG. 3 is a side elevation view of the receiver embodiment of the present invention.

FIGS. 3, 4, 5, 6 and 7 illustrate the adaptation of the principles of the present invention to a single receiver embodiment 50. FIG. 3 shows a side elevational view in cross-section to illustrate the transmission of electromagnetic energy within the element 50. The receiver 50 is made of a single block of solid glass or other suitable material. It has a flat, rectangular, forward surface 52. As shown more clearly in FIG. 4, the upper portion 54 of the surface 52 is transparent and provides an input aperture. The lower portion 56 of surface 52 is nonfunctional and painted black.

Figure 4:
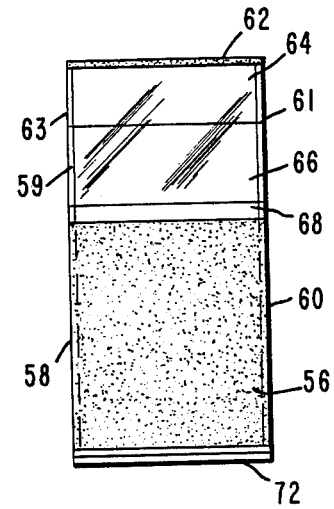
FIG. 4 is a front elevational view of the receiver embodiment of the present invention.

Referring to FIG. 4, two generally flat, reflective surfaces 58 and 60 delimit the sides of the receiver 50. Sides 58 and 60 have an optical cladding 59 and 61 of a lower index of refraction so that rays entering the receiver at a roll angle less than a predetermined maximum ($\theta_{max}$) will reflect without absorption off of the cladding. Rays entering at roll angles greater than $\theta_{max}$ will penetrate the cladding and impinge upon the surrounding black layer 63. The black layers thus remove such rays from the system by absorption.

The critical roll angle $\theta_{max}$ is related to the index of refraction of the glass ($n_g$) and the index of refraction of the cladding ($n_c$) as follows:

$$\text{Sine}^2 \theta_{max} = n_g^2 - n_c^2. \tag{1}$$

Chart 1 lists several acceptable combinations of glass and cladding.

CHART 1

| GLASS | INDEX | CLADDING | INDEX | ROLL ANGLE CUT |
|---|---|---|---|---|
| Fused Quartz | 1.4517 | SrF$_2$ | 1.40 | 22.58° |
| fK3 | 1.4576 | SrF$_2$ | 1.40 | 23.94° |
| BK1 | 1.5024 | SiO$_2$ | 1.4517 | 22.76° |
| K7 | 1.5031 | SiO$_2$ | 1.4517 | 22.94° |
| SF19 | 1.6497 | CeFl | 1.60 | 23.7° |
| BaSF2 | 1.6475 | CeFl | 1.60 | 23.13° |

Sides 58 and 60 extend normally from front surface 52 so as to partially define a chamber therebetween.

The top of the receiver is defined by a relatively small nonfunctional surface 62 from which planar reflective surfaces 64 and 66 extend at preselected angles, a second nonfunctional surface 68, and a planar transparent aperture 70. Surfaces 62 through 70 extend normally between surfaces 58 and 60.

Surfaces 64 and 66 are coated for internal reflectance. Surface 64 is angled relative to the input aperture 54 so that electromagnetic radiation 13 entering input aperture 54 at cone angles between predetermined limits are reflected to a line image at output aperture 70 via reflective curved surface 72. The elliptical curvature of surface 72 is described by the equation:

$$\frac{X^2}{A^2} + \frac{Y^2}{B^2} = 1 \tag{1}$$

where
  X = coordinate on X axis
  Y = coordinate on Y axis
  A = major semi-axis
  B = minor semi-axis In the case where A is very large relative to B, the ellipse approximates a parabola so closely that the difference is not significant. Similarly, surface 66 is angled relative to input aperture 54 so that incoming rays 12 will strike surface 72 and be reflected to a line image at output aperture 70.

In operation, the single receiver 50 will be mounted so as to receive reflections from transmitters operating alternatively and consecutively to generate, in the preferred embodiment, a flat fan and a conical fan. A fan is a field of view narrow in one dimension and wide in another usually orthogonal dimension. When a transmitter is operating within the flat fan, reflections from targets within the scanned area will enter the receiver 50 as at 12 in FIG. 3 and reflect off surface 66 into parallelism with the axis of the receiver 50 to power surface 72 and ultimately to a line image at the output aperture 70. Similarly, when a transmitter is operating within the conic fan, rays as at 13 in FIG. 3 enter the input aperture 54 and are reflected by surface 64 into parallelism with the axis of the receiver 50. These rays strike the power surface 72 and are reflected to a line image at the output aperture 70.

Figure 5:
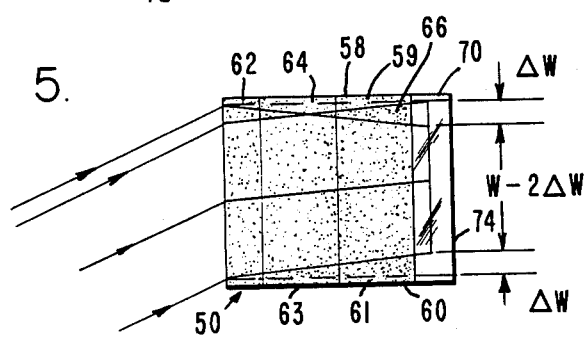
FIG. 5 is a top view of the receiver embodiment of the present invention.

As shown in FIG. 5, rays 12 or 13 may enter the input aperture 52 at any azimuth angle. However, because of the cladding only rays 12 and 13 within predetermined limits will be reflected by sides 58 and 60 to the output aperture 70. Rays outside the predetermined range pass through the cladding and are absorbed by the black layer and removed from the system as mentioned above.

As shown in FIG. 5, the power distribution at the output aperture 70 is dependent upon the angle of incidence of input power. FIG. 5 is illustrative of a input at a 15° azimuth angle. The resulting power distribution is seen at surface 70 as having a double power area of width $\Delta W$, a unit power area of width $W - 2\Delta W$, and no power area of width $\Delta W$, where W is the maximum width of the line image.

Note that the double power area and the no power area are equal. Thus, while the image at any azimuth for the receiver 50 is in a fixed line in an image plane, the distribution of power within that line will vary in a predictable manner with the azimuth angle. By selecting system parameters (length of folded path, width of element and index of refraction) properly, the case of double power on half the detector and no power on the other half can be achieved for any input angle. In the preferred embodiment, the desired angle $\theta_{max}$ is 22.5°.

The expression for W is:

$$W = 2L \tan \sin^{-1}\left(\frac{\sin e\ 22.5°}{n}\right)$$

where
 W = element width
 L = element length
 n = index of refraction of element.

For some of the core materials of Chart 1, the ratio of width-to-length has been calculated and is listed in Chart 2.

CHART 2

| Material | n | W/L |
|---|---|---|
| SiO | 1.4517 | .5466 |
| BK1 | 1.5024 | .5268 |
| Sf19 | 1.6497 | .4770 |

The power distribution along the line image on surface 70 is measured utilizing an electromagnetic detector 76, in the preferred embodiment a photodetector, which has two parts each covering half the length of the line into which the energy can fall. The amount of power in each detector can then be measured as a function of azimuth angle.

If initial radiance on the input aperture is uniform, it can be presumed that all energy in the image line would be uniform except for those areas which have been doubled or deleted. By determining the length $\Delta W$ and subtracting it from W/2 on the side with the void and adding it to W/2 on the side with the reflection, the relative power on each detector can be calculated. It can be shown that:

Power on one detector = $P_1 = (W/2) + \Delta W$
 Power on second detector = $P_2 = (W/2) - \Delta W$.

It can also be shown that if $P_1 > P_2$ energy is coming from the left of center and $P_1 < P_2$ energy is coming from the right of center and finally $$\theta = \frac{P_2}{P_1 + P_2 - 1} = \theta_{max} \times \left(P_1 - \frac{P_2}{P_1 + P_2}\right)$$

Figure 6:
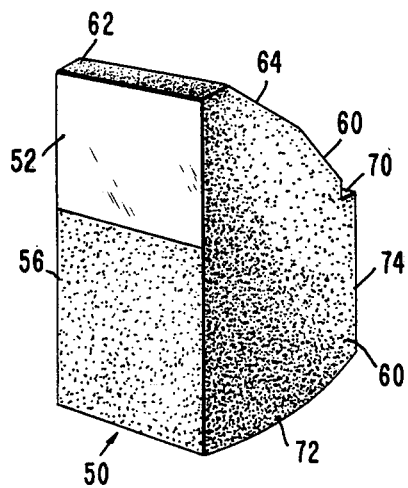
FIG. 6 is a front perspective view of the receiver embodiment of the present invention.
Figure 7:
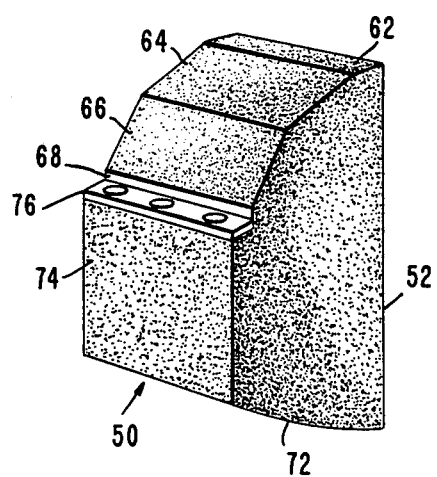
FIG. 7 is a rear perspective view of the receiver embodiment of the present invention.

The receiver 50 is shown in a front perspective in FIG. 6 and a rear perspective in FIG. 7. In FIG. 7, the split detector 76 is shown mounted on surface 70. Due to total internal reflectance, the side reflections of the receiver 50 are close to 100% efficient within roll angle limits $\pm \theta_{max}$. Thus for detection and ranging calculations the two detector outputs can be summed with no loss in aperture sensitivity.

Figure 8:
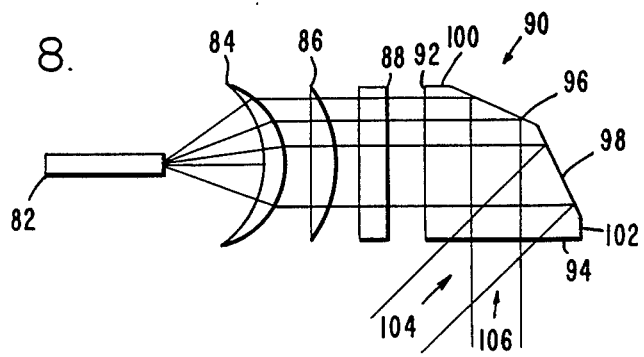
FIG. 8 is a side elevational view of the transmitter embodiment of the present invention.

As illustrated in FIG. 8, the principles of the present invention may be adapted to provide a transmitter with two beam patterns, a conic section and a section of a circular fan. As shown in FIG. 8, the transmitter 80 would include a source of electromagnetic radiation i.e., a diode laser 82, two collimating lenses 84, 86, a beam spreader 88, and the transmitter element 90.

The transmitter element 90 is very similar to the upper half of the receiver element 50. Surface 92 provides a transparent input aperture while surface 94 provides a transparent output aperture. Surfaces 96 and 98 extend at predetermined angles from nonfunctional surfaces 100 and 102 so as to reflect rays 12 entering the input aperture 92 through the output aperture 94 to a conic sectional fan 104 and a circular sectional 106. It is contemplated that this transmitter would be used with two detectors one for each pattern generated by the transmitter 80. Typical values for the receiver and transmitter of the present invention are listed below in Table 1.

TABLE 1

| Transmitter | |
|---|---|
| Radiation Source: | GaAs Laser Diode |
| Wavelength: | 0.904 μm |
| Peak Power Output Per Laser: | 50 watts |
| Emitted Pulse Width: | 20 n sec. |
| Pulse Repetition Frequency: | 8 kHz |
| Fan Beam Angle: | 45°/Sector, 16 Sectors |
| Elevation Angle of Beam: | 90° Plane & 60° Cone |
| Beam Angular Alignment Accuracy: | ±.5° from design value |
| Receiver | |
| Elevation Field Angle: | 3° |
| Elevation Angle | 90° Plane and 60° Cone |
| Aperture Area: | 45°/Sectors, 8 Dual Beam Sectors |
| Aperture Area: | 3.22 cm² |
| | 0.1 μm |
| | PIN Silicon Photo Diode |
| | Bi-reflectant Anamorphic, Folding Optics |

Figure 9:
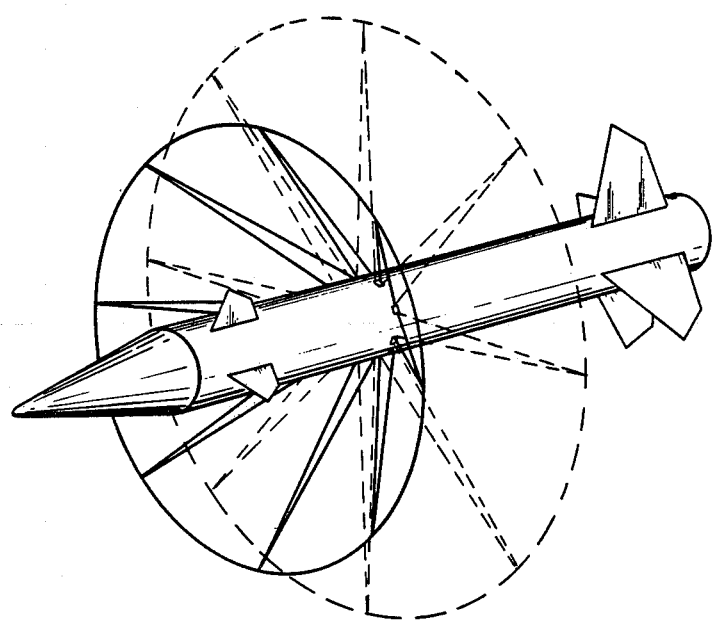
FIG. 9 is a perspective view of the fields of view generated about a missile equipped with receivers utilizing the principles of the present invention.

FIG. 9 shows the side view of the fan generated by two detectors utilizing the principles of the present invention having a cone angle of 30°. When a plurality of receivers 50 are arranged around the periphery of a missile or other suitable vehicle, two patterns are generated, one which approximates a cone and one which lies in a plane.

While the present invention has been described herein with reference to particular embodiments, it is to be understood that the invention is not limited thereto. Those having ordinary skill in the art to which this invention pertains will recognize modifications which may be made without departing from the scope of the invention. For example, the preferred embodiment of the present invention is made of glass; however, the advantages of the present invention may be realized by utilizing the teachings of the present invention to arrange reflective surfaces within a cavity so as to transform input electromagnetic radiation to a line image at some output aperture.

In addition, the concept of the present invention is not restricted to two optical fans. Three or more fans could be reflected into parallelism with the receiver axis and ultimately to a line image an output aperture by providing additional reflective surfaces. All fans would be close to conic with the 90° or flat case being the special case of a cone with a 90° angle.

The teachings of the present invention may be utilized to provide fans of a variety of geometric shapes. That is, one element can be modified to provide two conic patterns or two flat patterns.

It is therefore comtemplated by the appended claims to cover these and any other modifications and embodiments which constitute the essential features of the present invention.

What is claimed is:

1. A receiver for providing electrical signals indicative of the angles of incidence of electromagnetic radiation from a target in one of a plurality of predetermined fields of view comprising:
   a first planar transparent surface which provides an input aperture;
   second and third coparallel planar surfaces extending normally from said first planar surface so as to partially define a chamber therebetween, said second and third surfaces providing partially reflective interior sidewalls for said chamber;
   a plurality of fourth planar reflective surfaces, one for each field of view, extending normally between said second and third surfaces to at least partially define the top and rear surfaces of said chamber, each disposed relative to said first surface to reflect to a fifth surface electromagnetic radiation lying in a predetermined field of view;
   said fifth surface extending normally between said second and third surfaces to define the floor of said chamber, said fifth surface being reflective and curved so that electromagnetic radiation reflected from fourth surfaces is reflected by said fifth surface to a line image on an output aperture, whereby the radiant power distribution along said line image is proportional to the angle of incidence of said radiation relative to said first surface; and
   detector means mounted on said output aperture to measure the radiant power distribution along said line image and thereby develop an electrical signal indicative of the angle of incidence of electromagnetic energy.

2. The receiver of claim 1 wherein said second and third surfaces are cladded so that energy entering into said input aperture at angles of incidence in a predetermined range are reflected and those entering at angles of incidence outside a predetermined range are not.

3. The receiver of claim 1 wherein said detector means includes two detectors.

* * * * *